INVENTOR
GEERT SEFFINGA

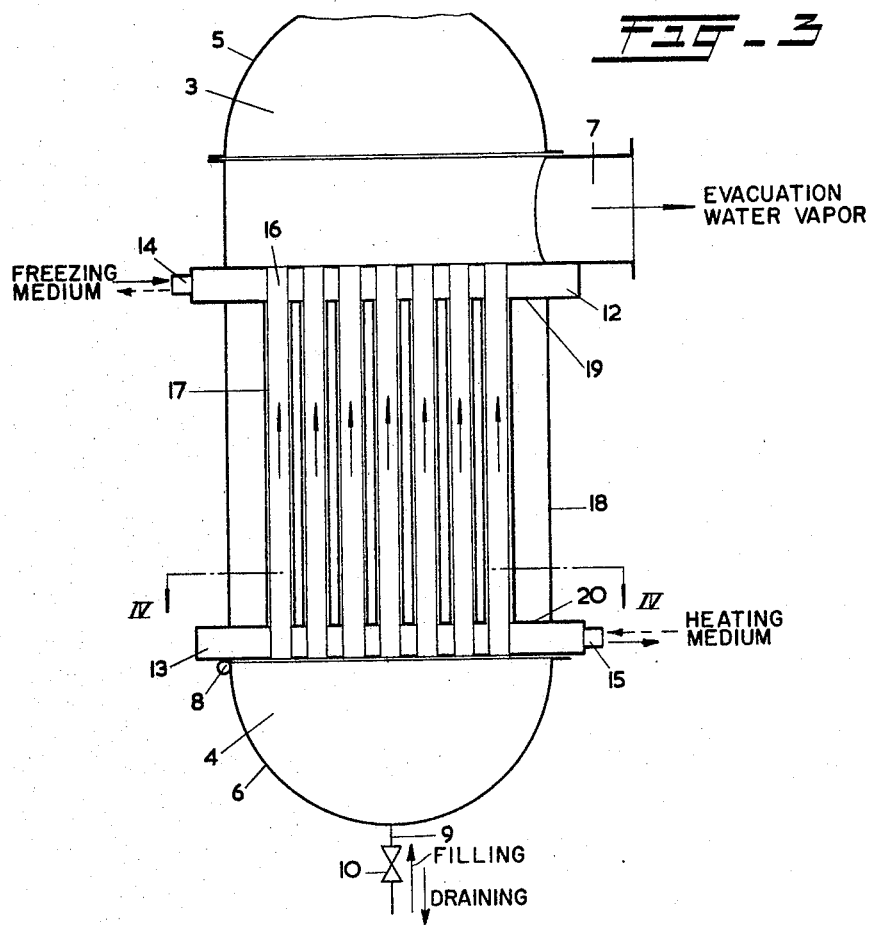
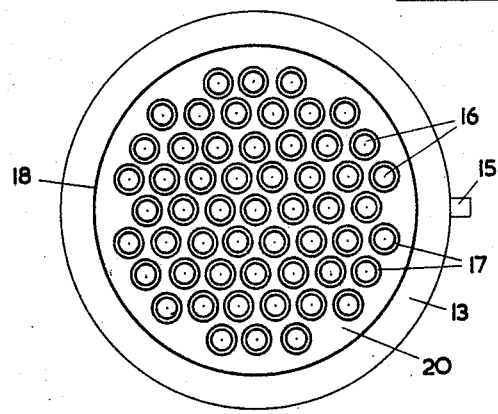

Aug. 9, 1966  G. SEFFINGA  3,264,745
PROCESS AND APPARATUS FOR FREEZING AND FREEZE-DRYING LIQUID
SUBSTANCES, AND APPARATUS FOR CARRYING OUT SAID PROCESS
Filed March 27, 1964  5 Sheets-Sheet 3

INVENTOR
GEERT SEFFINGA

Aug. 9, 1966     G. SEFFINGA     3,264,745
PROCESS AND APPARATUS FOR FREEZING AND FREEZE-DRYING LIQUID
SUBSTANCES, AND APPARATUS FOR CARRYING OUT SAID PROCESS
Filed March 27, 1964     5 Sheets-Sheet 5

INVENTOR
GEERT SEFFINGA
BY
ATTORNEY

United States Patent Office 3,264,745
Patented August 9, 1966

3,264,745
PROCESS AND APPARATUS FOR FREEZING AND FREEZE-DRYING LIQUID SUBSTANCES, AND APPARATUS FOR CARRYING OUT SAID PROCESS
Geert Seffinga, Ede, Netherlands, assignor to Sec N.V. Seffinga Engineering Company, Ede, Netherlands, a corporation of Dutch law
Filed Mar. 27, 1964, Ser. No. 355,507
Claims priority, application Netherlands, Mar. 29, 1963, 290,885
7 Claims. (Cl. 34—5)

The invention relates to a process for freezing and freeze-drying liquid substances.

In the process of freeze drying, as is well known, a material containing water in a frozen state is heated at a low temperature under vacuum so that drying will occur by the sublimation of ice from the material with evacuation of the resulting water vapor. Several ways of practicing freeze drying are described in Perry, Chemical Engineer's Handbook, 3rd ed. (1950), at pages 854–856.

According to a known process for freezing and freeze-drying liquid substances the product is first frozen outside the drier, after which it is subjected to freeze-drying on dishes which are placed in the drier on plates to be heated while being subjected to vacuum.

This known process presents the disadvantage that the layer of product becomes detached from the dish during the drying operation, with the result that a great heat resistance is set up between the dish and the product. This has the consequence that the dish temperature in connection with the additional heat resistance has to be higher if the desired amount of sublimation heat is to be supplied to the product. Because the layer of product has only local contact with the dish, the heat resistance between dish and product is not uniform throughout. This has the consequence that drying cannot be effected at the maximum drying rate without an excessively high product temperature occuring locally. The detachment of the layer of product thus involves the consequence that, when the product has dried at the points of contact, the dish temperature must become higher and the drying time becomes longer. The same thing that holds for the heat resistance between dish and product also holds for the heat resistance between dish and heating plate.

The object of the invention is a process in which the above-mentioned disadvantages do not occur and which at the same time makes it possible for the freezing and the freeze-drying operations to take place in a single apparatus.

To achieve this object, according to the invention the tubes of a bank of tubes are filled with the material to be treated, freezing medium is circulated about the tubes until a layer has frozen on to the inner walls of the tubes, the non-frozen material is removed, heating medium is circulated about the tubes while the layer frozen in them is subjected to vacuum, for the sublimation of the ice from the frozen layer of material until the ice has completely sublimed, the interior of the tubes at the same time being connected with a discharge device for the water vapour, and finally the material is removed from the tubes.

The invention also relates to an apparatus for carrying out the above-mentioned process, which apparatus comprises a bank of tubes arranged within a sheath, the individual tubes of which bank communicate both at the top and at the bottom with a space, while the sheath is furnished with an inlet and an outlet, said two connections communicating with the space for the freezing medium and the heating medium respectively round the tubes of the bank, which space is shut off from the first-mentioned spaces.

Such a tube drier presents the advantage that the layer of product has much less tendency to be detached from the tube than from a dish, for instance. Owing to the improved thermal contact between product and wall the drying time can be reduced and a lower temperature of the heating medium will suffice. Furthermore, for a given capacity the tube drier as an apparatus is simpler and less expensive than a plant in which freezing takes place separately and drying dishes are used. Moreover, with such a drier it is possible without much difficulty to suject large quantities of material under sterile non-oxidative conditions to freeze-drying, which is not the case with the known apparatus. Finally the product can be removed without much difficulty from the drier without its coming into contact with water vapour from the surrounding space.

The medium circulating around the tubes may be a medium which evaporates during the freezing operation and condenses during the drying operation. In that case it is not necessary to fit round the tubes any device for conducting the medium.

If the medium circulating about the tubes is a substance whose phase does not change during the freezing and drying operations, this medium has to be passed in an adequate manner through the sheath surrounding the tubes. If this is done by fitting baffles at right angles to the tubes, no uniformly thick layer is frozen on to the tubes, in consequence of which the drying time will be longer. In fact, the drying time is then dependent upon the maximum layer thickness.

According to the invention the medium is circulated uniformly about the tubes because each of the tubes of the bank is surrounded by a second, concentrically fitted tube, the annular spaces thus formed constituting the spaces for the freezing medium and the heating medium respectively.

A second method for circulating the medium through the sheath according to the invention is that, between the tubes of the bank, spacers closed on either side are mounted over practically the whole length of the tubes, in such a manner that slots are formed between the tubes and the spacers for the passage of the freezing medium and the heating medium respectively.

In the apparatuses so far described the water vapour is removed by means of a separate vacuum forming device via the discharge pipe. Thus it is possible to cause the water vapour to condense elsewhere on a cold surface.

It is a further object of the invention to improve these apparatuses by causing the water vapour to condense on a cold surface forming part of the apparatus. To achieve this object, round the above-mentioned sheath is fitted a second sheath, the annular space formed between the two said sheaths being in free communication with the above-mentioned spaces at the top and the bottom, and at the top or the bottom respectively, while in this space round the first-mentioned sheath are arranged one or more cold surfaces as well as one or more connections, through which any gases which do not condense at the temperature of the cold surface can be discharged, the arrangement being such that the water vapour formed during the drying operation is invariably passed over one or more cold surfaces.

By this means the following advantages are obtained:
(a) Compact construction
(b) Low resistance to flow between drier and cold surface
(c) Insulation of the drier is not necessary because the annular space around the drier forms a good thermal insulation during the drying operation and a sufficient thermal insulation during the relatively short freezing operation.

The invention is elucidated by reference to the drawings.

FIG. 3 illustrates a vertical tube drier with concentrically fitted tubes.

FIG. 4 is a horizontal cross-section along IV—IV in FIG. 3.

Figure 1:
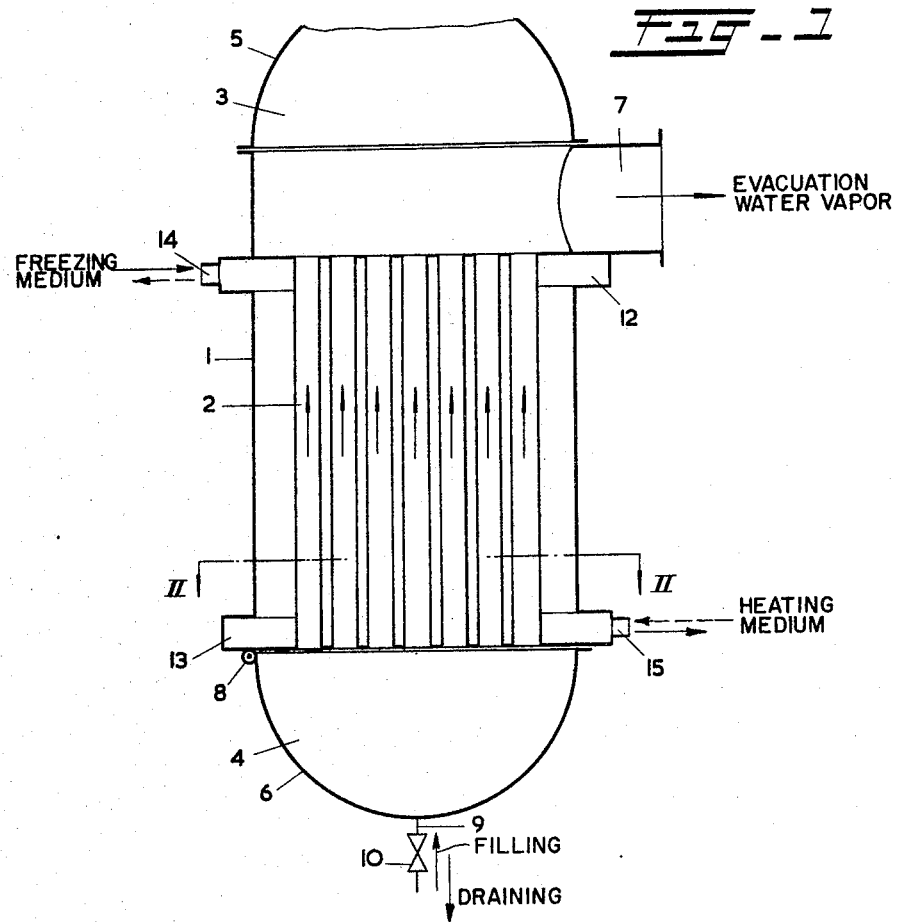
FIG. 1 illustrates a vertical tube drier according to the invention.
Figure 2:
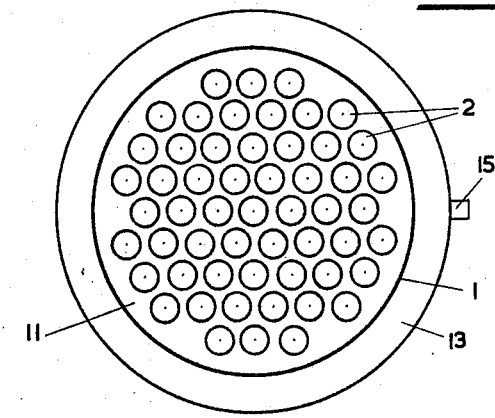
FIG. 2 is a horizontal cross-section along II—II in FIG. 1.

The vertical tube drier according to FIGS. 1 and 2 comprises a sheath 1 enclosing tubes 2 which end at the top and the bottom respectively in spaces 3 and 4, respectively, which are formed by an upper lid 5 and a lower lid 6 respectively. The upper space 3 moreover communicates with a source of vacuum through a discharge pipe 7 for the water vapor formed. Connected to the lower lid 6, which is attached to a sheath 1 at 8 by means of a hinge, is a conduit 9 with a sut-off valve 10. The compartment or space 11 within the sheath 1 not occupied by the tubes 2 is shut off both at the top and at the bottom from the spaces 3 and 4 respectively. Encirculating this space 11 both at the top and at the bottom are annular channels 12 and 13 respectively, which communicate with the space 11. These channels 12 and 13 are furnished with connections 14 and 15 respectively.

The material to be frozen and dried, such as a liquid, is introduced into the drier until the tubes 2 are completely filled with it. Subsequently via connection 14 and the channel 12 freezing medium is admitted round the tubes 2 and in the space 11 and discharged via the channel 13 and connection 15. After a sufficiently thick layer of the product has frozen on to the inside of the tubes 2, the supply of the freezing medium is stopped, whereupon via the conduit 9 and shut-off valve 10 the liquid still present is drawn off. Via connections 15 and channel 13 heating medium is subsequently admitted round the tubes 2 in the space 11 and discharged via channel 12 and connection 14. At the same time the discharge pipe 7 is connected to a vacuum forming discharge device for the water vapor. When the ice from the frozen product has completely sublimed, the supply of the heating medium is stopped and the connection with the discharge device for the water vapor is interrupted. Subsequently the lid 6 is turned back about the hinge 8 and the product is removed from the tubes.

FIGS. 3 and 4 illustrate a tube drier which is intended in particular for freezing media and/or heating media whose phase does not change during the freezing and the drying operation respectively, although this apparatus is also suitable for other media. To this end, tubes 17 have been arranged concentrically about the tubes 16. As in the embodiment according to FIGS. 1 and 2, a compartment or space within the sheath and about the tubes 16, which protrude from the tubes 17 both at the top and at the bottom, is shut off at the top and the bottom from the spaces into which the tubes 16 end. In consequence, this is also the case for the annular spaces between the tubes 16 and 17. At the upper and lower ends of the tubes 17 the entire cross-section within the sheath 18 around these tubes 17 is shut off by baffles 19 and 20 respectively, so that the freezing medium and the heating medium respectively, which are supplied and discharged via circular channels, which communicate with the annular spaces between the tubes 16 and 17 only at the top and the bottom, flows only through these spaces.

Figure 5:
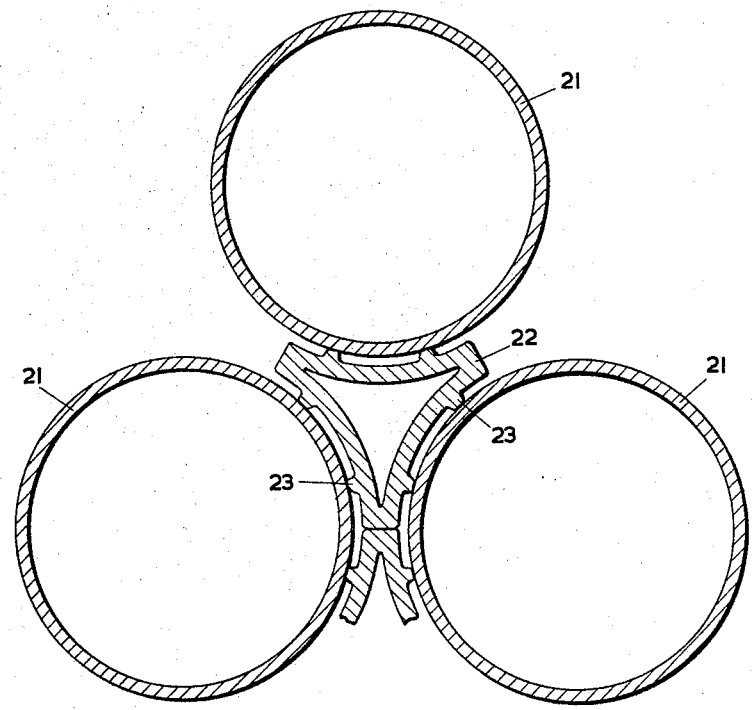
FIG. 5 illustrates a portion of a bank of tubes with a spacer.

FIG. 5 shows a different solution for the problem of freezing and drying with a medium whose phase does not change. In this case slots are formed round the tubes 21, for the passage of the media, by the arrangement of spacers 22, furnished with suitable protrusions 23, which are in contact with the tubes 21. These spacers are held in place at the ends, for instance, by means of pins, but are not connected with the tubes 21.

Figure 6:
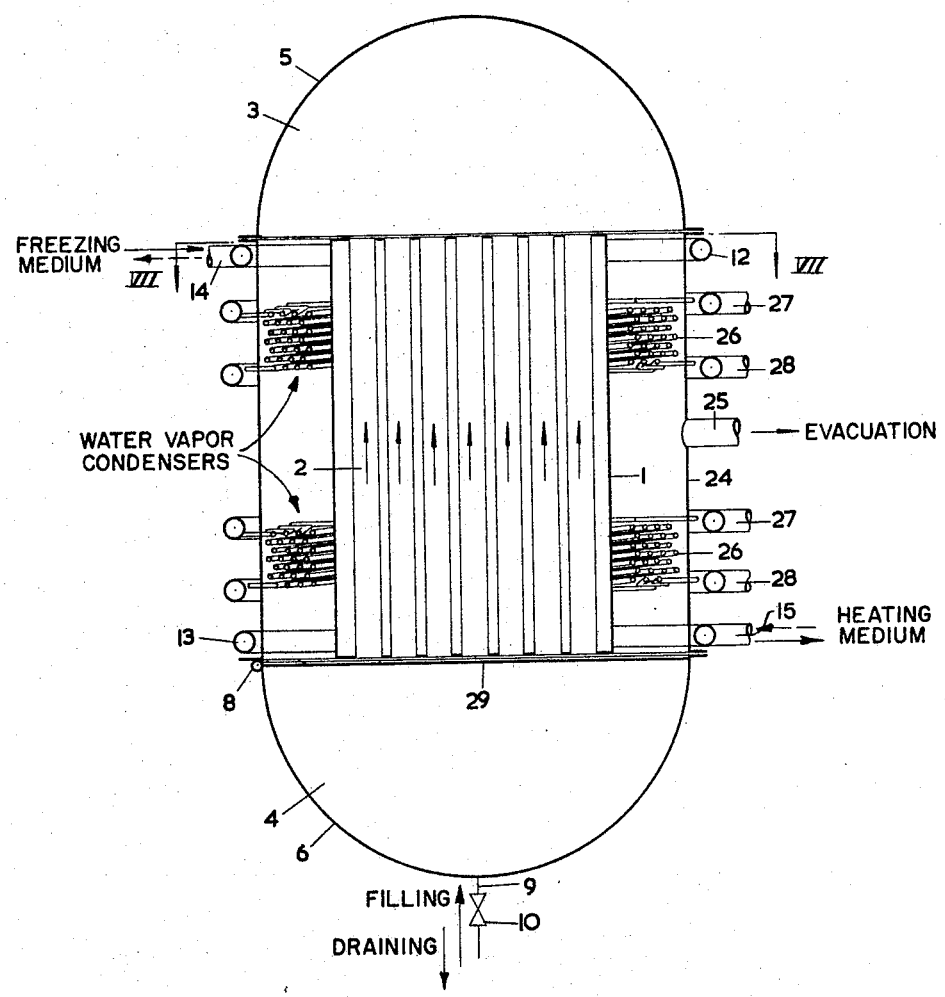
FIG. 6 illustrates a vertical tube drier according to a different embodiment.
Figure 7:
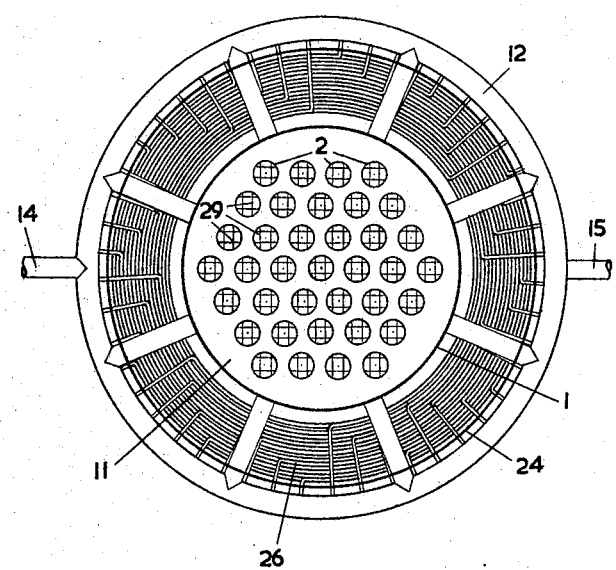
FIG. 7 is a horizontal cross-section along VII—VII in FIG. 6.

The vertical tube drier according to FIGS. 6 and 7 comprises a sheath 1, enclosing tubes 2, which end at the top and the bottom respectively in spaces 3 and 4 respectively.

Arranged around the sheath 1 is a second sheath 24, which is connected in a suitable manner with the sheath 1. The spaces 3 and 4 respectively are formed by an upper lid 5 and a lower lid 6 respectively, attached to the sheath 24, the lower lid being attached to the sheath 24 at 8 by means of a hinge, while a conduit 9 with a shunt-off valve 10 is connected to it. To the lower lid 6 a wire gauze member 29 is further attached, which serves to prevent the tubular products from sinking down, owing to the shrinking of the product, before all the ice has sublimed from the product. The compartment or space 11 within the sheath 1 which is not occupied by the tubes 2 is shut off both at the top and at the bottom from the spaces 3 and 4 respectively. Encircling this space 11 both at the top and at the bottom are annular channels 12 and 13 respectively, which communicate with the space 11. These channels 12 and 13 are furnished with connections 14 and 15 respectively.

In the annular space between the sheaths 1 and 24, which communicates with a space 3 as well as with the space 11, is an array of cooling surfaces constituted by two vertically spaced bundles of cooling pipes 26. Each of these bundles of pipes is connected with a supply line 28 and an exhaust line 27 for a cooling medium. In the annular space between the bundles of cooling pipes the sheath 24 is provided with a gas exhaust line 25.

The liquid substance to be frozen and dried is brought into the drier until the tubes 2 are completely filled with it. Then via connection 15 and channel 13 a freezing medium is admitted into the space 11 around the tubes 2, this medium being discharged via channel 12 and connection 14. After a sufficiently thick layer of the product has frozen onto the inner surfaces of the tubes 2 the supply of the freezing medium is stopped, after which via the conduit 9 and the valve 10 the liquid still present is drained off. Then the heating medium is admitted into the space 11 around the tubes 2 via connection 14 and channel 12 and exhausted via channel 13 and connection 15. Before the heating medium is admitted the annular space and the spaces communicating therewith are evacuated by means of a device connected to the exhaust line 25. During the drying process said device discharges the gases not condensing on the cold surfaces 26. When the ice from the product is completely sublimated the admittance of heating medium is stopped as is also the connection of the exhaust 25 with the exhaust device. Then the drying space is aerated, after which the lid 6 is pivoted about the hinge 3 and the dried product removed from the tubes.

It is to be noted that in all the embodiments the tubes are preferably made of restless steel and have to remain straight, to ensure easy removal of the products. For that reason the sheath must not exert any force on the tubes with variations of the temperature.

What I claim is:

1. A process for freezing and freeze drying liquid substances, which comprises filling the tubes of a bank of upright tubes with a liquid substance to be dried, circulating a freezing medium about the tubes until a frozen layer of said substance has formed on the inner surfaces of the tubes, draining the remaining liquid substance from the tubes, then by circulating a heating medium about the tubes while subjecting said layer to vacuum subliming ice from said frozen layer and drawing off the water vapor formed, and finally discharging the dried layer from the tubes.

2. An apparatus for freezing and freeze drying liquid substances, comprising an upright casing containing a bank of tubes having their inner surfaces vertically disposed, said casing having upper and lower end portions forming enclosed chambers communicating, respectively, with the upper and lower ends of said tubes, a compartment communicating with the outer surfaces of said tubes but closed off from said chambers, means for respectively introducing a liquid substance to be dried into said tubes to fill said tubes and draining a surplus of the liquid substance away from said tubes, means connected with said compartment for circulating in contact with said outer surfaces, respectively, a cooling medium at a temperature sufficiently depressed to freeze a layer of said substance onto said inner surfaces and then, while said layer is subjected to vacuum, a heating medium at a temperature sufficient to sublime ice from said layer, and means communicable with the insides of said tubes through at least one of said chambers for subjecting said layer to vacuum and drawing off the water vapor sublimed therefrom.

3. An apparatus according to claim 2, the lower end portion of said casing comprising a closure that is movable to expose the lower ends of said tubes for the discharge of dried material from said tubes by gravity.

4. An apparatus according to claim 2, said compartment comprising upper and lower head chambers interconnected by tubular walls respectively surrounding the individual tubes of said bank to form therewith annular spaces for conducting said cooling medium and said heating medium respectively in intimate contact with said outer surfaces.

5. An apparatus according to claim 2, said tubes having mounted between them over practically their whole length spacers which are closed along either side thereof so as to form slots between said tubes and said spacers for conducting said cooling medium and said heating medium respectively in intimate contact with said outer surfaces.

6. An apparatus according to claim 2, further comprising a chamber surrounding said bank of tubes and said compartment and communicating with said enclosed chambers, means including an array of cooling surfaces in said surrounding chamber for condensing said water vapor, and means connecting said means for drawing off said water vapor with said surrounding chamber so that the water vapor sublimed from said layer is passed in contact with and condensed by said cooling surfaces.

7. An apparatus according to claim 2, further comprising a chamber surrounding said bank of tubes and said compartment and communicating with said enclosed chambers, said surrounding chamber containing vertically spaced bundles of cooling pipes for condensing said water vapor, and means connecting said means for drawing off said water vapor with said surrounding chamber at a location between said bundles of cooling pipes so that the water vapor sublimed from said layer is passed in contact with and condensed by said cooling pipes.

References Cited by the Examiner

UNITED STATES PATENTS

| | | | |
|---|---|---|---|
| 2,397,347 | 3/1946 | Gruner | 62—348 X |
| 2,471,677 | 5/1949 | Flosdorf | 34—5 X |
| 2,721,452 | 10/1955 | Brandin et al. | 62—348 X |
| 2,749,721 | 6/1956 | Trepaud | 62—348 X |

FOREIGN PATENTS

| | | |
|---|---|---|
| 1,017,726 | 12/1952 | France. |
| 552,821 | 4/1943 | Great Britain. |
| 928,925 | 6/1963 | Great Britain. |

ROBERT A. O'LEARY, *Primary Examiner.*

W. E. WAYNER, *Assistant Examiner.*